United States Patent [19]
Kreipe

[11] Patent Number: 5,830,290
[45] Date of Patent: Nov. 3, 1998

[54] METHOD FOR THE MANUFACTURE OF A SPRING BAND CLIP

[75] Inventor: Hans-Jürgen Kreipe, Brachttal, Germany

[73] Assignee: Rasmussen GmbH, Maintal, Germany

[21] Appl. No.: 728,098

[22] Filed: Oct. 9, 1996

[30] Foreign Application Priority Data

Oct. 10, 1995 [DE] Germany .................. 195 37 736.2
Aug. 22, 1996 [DE] Germany .................. 196 33 789.5

[51] Int. Cl.$^6$ .............................. C21D 9/02; C22C 38/22
[52] U.S. Cl. ..................... 148/580; 148/578; 148/567; 148/568; 148/625; 148/636; 148/645; 148/286
[58] Field of Search ................. 148/578, 580, 148/567, 568, 625, 636, 645, 286

[56] References Cited

U.S. PATENT DOCUMENTS

| | | | |
|---|---|---|---|
| 3,691,601 | 9/1972 | Hough .................................. | 29/150 |
| 4,148,699 | 4/1979 | Mayer et al. .................... | 204/129.85 |
| 4,846,904 | 7/1989 | Arai et al. ........................ | 148/325 |
| 5,186,768 | 2/1993 | Nomoto et al. .................. | 148/580 |

FOREIGN PATENT DOCUMENTS 4212966 10/1993 Germany .

*Primary Examiner*—Sikyin Ip
*Attorney, Agent, or Firm*—Darby & Darby

[57] ABSTRACT

The subject invention provides a method for manufacturing a spring band clip, wherein an alloyed steel is shaped, annealed, levelled into a narrow band, then shaped by stamping and bending into a non-machined clip, and the surface of the non-machined clip is smoothed and treated to produce resistance to corrosion; wherein the steel comprises iron as the main component and one or more of the following components by weight: 0.32 to 0.55% C; up to 2.0% Si; up to 2.0% Mn; up to 0.04% P; up to 0.04% S; 17.5 to 20% Cr; up to 1% Ni; 0.5 to 2.5% Mo; up to 0.5% V; up to 0.1% Al; up to 0.1% Co; up to 0.4% Cu; up to 0.4% Pb; up to 0.1% Se; up to 0.1% Te; up to 0.005% Ti; up to 0.1% W; up to 0.05% Zr; up to 0.01% $O_2$; up to 0.01% N; up to 0.1% Bi; up to 0.001% B; up to 0.05% Nb; wherein the non-machined clip is austenitized prior to being smoothed and is converted into martensite by heat treatment in a salt-, oil-, or water bath, or by quenching at about the austenitizing temperature. The subject method of manufacture affords a product with good corrosion resistance, sufficient mechanical strength and spring capacity, while avoiding the need for an anti-corrosion coating which is harmful to the environment.

10 Claims, No Drawings

METHOD FOR THE MANUFACTURE OF A SPRING BAND CLIP

BACKGROUND OF THE INVENTION

This invention relates to a method for manufacturing a spring band clip, wherein an alloyed steel is shaped, annealed, levelled into a narrow band, and then shaped by stamping and bending into a non-machined clip, and the surface of the non-machined clip is smoothed and treated to be resistant to corrosion.

Several methods to manufacture a spring band clip have been previously disclosed. In German Patent Specification 39 00 190, for example, CK75 steel or a low-alloy special construction steel 50CrV4 is used to obtain the desired spring capacity. However, these steels are not anti-corrosive. As a result, they must be coated in an additional step with an anti-corrosive coating, e.g., with an organic chemical substance and/or a plastic material. However, these anti-corrosive coatings are often harmful to the environment. Such environmental harm may occur at the time of manufacturing the coating as well as at the end of the useful lifetime of the spring band clip when it is discarded.

In addition, spring band clips made with this coating are generally inadequate in terms of mechanical strength. Because of this inherent weakness, the spring band clip can undergo mechanical damage so as to cause the clip to corrode and completely fail to perform its function. In the event of such failure, considerable damage can result under normal operating conditions. For example, when the spring band clip is being used to clamp a radiator hose or fuel line in a motor vehicle, failure of the clip can result in serious damage to an internal combustion engine.

A major deficiency of a spring band clip coated in this way is that it can only be pre-assembled with a pipe by pasting it to the pipe. This mode of application results in considerable uncertainty or inconvenience during manufacture where the pipe is to be assembled with the clip by means of robotic methods since the adhesive paste can readily become detached from the coating. In addition, a spring band clip which has become detached from the pipe can present severe safety threats. In cases where the clip is prestressed or biased by a safety clamp, it can possibly spring back if handled roughly or carelessly, and thereby cause injury to persons. A further disadvantage of the application of an anti-corrosive coating as practiced in the prior art is the additional expenditure in terms of labor and materials required to apply the coating.

DETAILED DESCRIPTION OF THE INVENTION

The object of the subject invention is to provide a method for manufacturing a spring band clip wherein the use of an anti-corrosive coating is avoided but where the clips produced still retain the desired spring capacities.

According to the subject invention, this object is achieved by using steel which comprises iron as the main component and one or more of the following components (by weight): 0.32 to 0.55% C; up to 2.0% Si; up to 2.0% Mn; up to 0.04% P; up to 0.04% S; 17.5 to 20% Cr; up to 1% Ni; 0.5 to 2.5% Mo; up to 0.5% V; up to 0.1% Al; up to 0.1% Co; up to 0.4% Cu; up to 0.4% Pb; up to 0.1% Se; up to 0.1% Te; up to 0.005% Ti; up to 0.1% W; up to 0.05% Zr; up to 0.01% $O_2$; up to 0.01% N; up to 0.1% Bi; up to 0.001% B; up to 0.05% Nb. In addition, the material of the non-machined clip is austenitized prior to being smoothed and tempered. This is done preferably by heat treatment in a salt-, oil-, or water bath, or by quenching the non-machined clip at about the austenitizing temperature. This procedure converts the material into martensite. Preferably, the steel employed to manufacture the subject spring clip comprises a maximum 0.4% of C, 0.5% of Si, 0.8% of Mn, and 2.0% of Mo and a minimum of 0.5% of Ni, 1.5% of Mo and 0.25% of V.

Optimum resistance to corrosion results from a thermal treatment comprising austenitizing, quenching and tempering by passivating the surface.

In the heat treatment, an austenitizing temperature above the austenite-carbon-solution end-temperature is preferably maintained for a period of less than 10 seconds. At this temperature, almost all the carbide (carbon compounds) in the matrix is dissolved, and a very fine homogeneous microstructure results with significantly improved strength. The holding time period of less than 10 seconds during the austenitizing phase favorably precludes the establishment of grain growth. The austenitizing treatment can be carried out simply by inductive heating of the non-machined clip.

Following quenching, tempering should take place with subsequent refrigeration to below 0° C. In this way, any residual austenite is converted into martensite.

The passivation treatment can be carried out in an oxidizing acid, preferably nitric acid.

The non-machined annealed clip can be smoothed by tumbling with grindstones, or by sandblasting or shot blasting.

DESCRIPTION OF THE PREFERRED EMBODIMENTS

In preferred embodiments of the invention, iron is mixed as the main component of the material of the spring band clip with other elements in a ratio according to the following table:

| Element | % by weight | 1st Alternative % by weight | 2nd Alternative % by weight |
|---|---|---|---|
| C | 0.32–0.55 | 0.32–0.4 | 0.48 |
| Si | ≦2.0 | ≦0.5 | 0.3 |
| Mn | ≦2.0 | ≦0.8 | 0.3 |
| P | ≦0.04 | ≦0.04 | 0.010–0.020 |
| S | ≦0.04 | ≦0.015 | 0.008 |
| Cr | 17.5–20.0 | 17.5–20.0 | 18 |
| Ni | ≦1 | 0.5–1 | 0.5 |
| Mo | 0.5–2.0 | 1.5–2.5 | 1.7 |
| V | ≦0.5 | 0.25–0.5 | 0.2 |
| Al | ≦0.1 | ≦0.1 | ≦0.1 |
| Co | ≦0.1 | ≦0.1 | ≦0.1 |
| Cu | ≦0.4 | ≦0.4 | ≦0.4 |
| Pb | ≦0.1 | ≦0.1 | ≦0.1 |
| Se | ≦0.1 | ≦0.1 | ≦0.1 |
| Te | ≦0.1 | <0.1 | ≦0.1 |
| Ti | ≦0.05 | ≦0.05 | ≦0.05 |
| W | ≦0.1 | ≦0.1 | ≦0.1 |
| Zr | ≦0.05 | ≦0.05 | ≦0.05 |
| $O_2$ | ≦0.01 | ≦0.01 | ≦0.01 |
| N | ≦0.01 | ≦0.01 | ≦0.01 |
| Bi | ≦0.1 | ≦0.1 | ≦0.1 |
| B | ≦0.001 | ≦0.001 | ≦0.001 |
| Nb | ≦0.05 | ≦0.05 | ≦0.05 |

This mixture is melted in a blast furnace, cast, and rolled into a wide strip or wire. A clip is produced from the hot rolled wide strip or wire in one of two ways:

a) The hot rolled wide strip is rolled out further, cut up into relatively narrow strips, and rounded or bevelled at the edges.

b) The rolled wires, or, alternatively, drawn wires, are rolled flat.

With both methods a) and b), the material is annealed between the intermediate rolling steps. After a final annealing treatment, the narrow strip is subjected to a levelling stage; i.e., it is rolled to its final size by cold deformation methods. A non-machined clip is produced from the annealed narrow strip by means of a plurality of stamping- and bending operations.

The non-machined clip is then heated by induction until the microstructure has undergone full austenitization. It is then quenched in a salt bath in order to convert the austenite isothermally into martensite. Heating is at a temperature which far exceeds the austenite-carbon-solution end-temperature $A_{Cle}$ which is approximately 1,080° to 1,250° C. During heating, the temperature is maintained for less than 10 seconds. A very fine homogeneous microstructure of high strength results from such austenitizing heat treatment, and is particularly advantageous for spring band clips.

Alternatively, the non-machined clips can be quenched after the inductive heating step in a liquid such as oil or water. To convert any residual austenite in the microstructure into martensite, refrigeration to below about 0° C. is carried out following the annealing stage.

After this tempering during the martensite-forming stage, the surfaces and edges of the clips are smoothed, e.g., by way of shot peening. This may be performed, for example, by tumbling with grindstones or by blasting in order to remove imperfections caused during production and to smooth the surface.

Finally, the clips prepared as described above are passivated in order to make them anti-corrosive. This step is carried out using an oxidizing acid. Preferably, the acid is nitric acid.

The spring band clips manufactured in accord with the subject invention are extremely anti-corrosive, but nonetheless have spring capacities which are desirable for such clips. Thus, clips manufactured by the method of the invention will withstand exposure to salt spray, under test conditions, for a period of 400 hours without the formation of any red rust corrosion.

What is claimed is:

1. A method for manufacturing a spring band clip, comprising the steps of
   (a) shaping, annealing, and levelling alloyed steel into a narrow strip;
   (b) stamping and bending the narrow strip to form a non-machined clip;
   (c) austenitizing the non-machined clip material to produce an austenite phase, quenching the non-machined clip material at about the austenitizing temperature to convert the austenite phase into martensite phase; and
   (d) smoothing and tempering the surface of the non-machined clip, and passivating the non-machined clip to produce resistance to corrosion.

2. The method of claim 1 wherein the alloyed steel comprises iron as the main component and one or more of the following components by weight:
   0.32 to 0.55% C; up to 2.0% Si; up to 2.0% Mn; up to 0.04% P; up to 0.04% S; 17.5 to 20% Cr; up to 1% Ni; 0.5 to 2.5% Mo; up to 0.5% V; up to 0.1% Al; up to 0.1% Co; up to 0.4% Cu; up to 0.4% Pb; up to 0.1% Se; up to 0.1% Te; up to 0.005% Ti; up to 0.1% W; up to 0.05% Zr; up to 0.01% $O_2$; up to 0.01% N; up to 0.1% Bi; up to 0.001% B; up to 0.05% Nb.

3. The method of claim 2 wherein the alloyed steel comprises a maximum of 0.4% C, of 0.5% Si, of 0.8% Mn and of 2.0% Mo, and a minimum of 0.5% Ni, of 1.5% Mo and of 0.25% V.

4. The method of claim 1 wherein, in the austenitizing step, the alloyed steel is heat-treated in a salt, oil or water bath.

5. The method of claim 1 wherein, in the austenitizing step, the temperature above the austenite-carbon-solution end-temperature is maintained for a time period of between about 1 to about 10 seconds.

6. The method of claim 1 wherein step (d) further comprises, after quenching, tempering by refrigeration to below about 0° C.

7. The method of claim 1 wherein the surface of the clip is passivated in an oxidizing acid.

8. The method of claim 7 wherein the acid is nitric acid.

9. The method of claim 1 wherein the non-machined clip is austenitized by inductive heating.

10. The method of claim 1 wherein the non-machined clip is smoothed by tumbling with grindstones, or by sandblasting or shot blasting.

* * * * *